US009146761B2

(12) United States Patent
Lee et al.

(10) Patent No.: US 9,146,761 B2
(45) Date of Patent: Sep. 29, 2015

(54) VIRTUALIZATION SYSTEM AND RESOURCE ALLOCATION METHOD THEREOF

(75) Inventors: Il Ho Lee, Suwon-si (KR); In Choon Yeo, Suwon-si (KR); Joong Baik Kim, Seoul (KR); Seung Wook Lee, Suwon-si (KR); Kyoung Hoon Kim, Suwon-si (KR); Jeong Ig Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 13/225,727

(22) Filed: Sep. 6, 2011

(65) Prior Publication Data

US 2012/0060168 A1 Mar. 8, 2012

(30) Foreign Application Priority Data

Sep. 6, 2010 (KR) ........................ 10-2010-0086968

(51) Int. Cl.
| | |
|---|---|
| *G06F 9/46* | (2006.01) |
| *G06F 9/455* | (2006.01) |
| *G06F 9/48* | (2006.01) |
| *G06F 9/50* | (2006.01) |

(52) U.S. Cl.
CPC .......... *G06F 9/45533* (2013.01); *G06F 9/4887* (2013.01); *G06F 9/5077* (2013.01); *Y02B 60/142* (2013.01); *Y02B 60/144* (2013.01); *Y02B 60/146* (2013.01); *Y02B 60/167* (2013.01)

(58) Field of Classification Search
USPC ........................................................ 718/104
See application file for complete search history.

(56) References Cited

U.S. PATENT DOCUMENTS

| | | | | |
|---|---|---|---|---|
| 7,437,730 | B2* | 10/2008 | Goyal ........................... | 718/105 |
| 8,301,742 | B2* | 10/2012 | Hanson et al. ................ | 709/223 |
| 8,387,060 | B2* | 2/2013 | Pirzada et al. ................ | 718/104 |
| 8,397,232 | B2* | 3/2013 | Iwamatsu et al. ................. | 718/1 |
| 2004/0267548 | A1* | 12/2004 | Jones ................................. | 705/1 |
| 2007/0214456 | A1* | 9/2007 | Casey et al. ................... | 718/100 |
| 2008/0034370 | A1* | 2/2008 | Huizenga ....................... | 718/104 |
| 2008/0155092 | A1* | 6/2008 | Kumar et al. ................. | 709/224 |
| 2008/0184229 | A1* | 7/2008 | Rosu et al. ........................ | 718/1 |
| 2010/0138832 | A1 | 6/2010 | Kim et al. | |
| 2010/0153963 | A1* | 6/2010 | Kakarlamudi et al. ....... | 718/105 |
| 2010/0162259 | A1* | 6/2010 | Koh et al. ..................... | 718/104 |
| 2010/0169536 | A1* | 7/2010 | Shedel et al. ..................... | 711/6 |

(Continued)

FOREIGN PATENT DOCUMENTS

KR 10-2010-0063368 A 6/2010

OTHER PUBLICATIONS

HP, HP Integrity Essentials Global Workload Manager: Workload Management for HP Integrity Virtual Machines, HP, Mar. 2007, 18 pages.*

*Primary Examiner* — Diem Cao
(74) *Attorney, Agent, or Firm* — Jefferson IP Law, LLP

(57) ABSTRACT

A virtualization system for supporting at least two operating systems and resource allocation method of the virtualization system are provided. The method includes allocating resources to the operating systems, calculating, when one of the operating systems is running, workloads for each operating system, and adjusting resources allocated to the operating systems according to the calculated workloads. The present invention determines the workloads of a plurality of operating systems running in the virtualization system and allocates time resources dynamically according to the variation of the workloads.

15 Claims, 13 Drawing Sheets

(56) References Cited

U.S. PATENT DOCUMENTS

| | | | |
|---|---|---|---|
| 2011/0055370 A1* | 3/2011 | Kern et al. | 709/224 |
| 2011/0225299 A1* | 9/2011 | Nathuji et al. | 709/226 |
| 2012/0210337 A1* | 8/2012 | Cardona et al. | 719/321 |
| 2012/0246107 A1* | 9/2012 | Beaty et al. | 706/52 |
| 2012/0246320 A1* | 9/2012 | Waldspurger | 709/226 |

* cited by examiner

VIRTUALIZATION SYSTEM AND RESOURCE ALLOCATION METHOD THEREOF

PRIORITY

This application claims the benefit under 35 U.S.C. §119 (a) of a Korean patent application filed on Sep. 6, 2010 in the Korean Intellectual Property Office and assigned Serial No. 10-2010-0086968, the entire disclosure of which is hereby incorporated by reference.

BACKGROUND OF THE INVENTION

1. Field of the Invention

The present invention relates to a virtualization system for supporting at least two operating systems and a resource allocation method of the virtualization system. More particularly, the present invention relates to a method for allocating hardware resources on multiple cores of the virtualization system supporting at least two operating systems and a system for executing the resource allocation method.

2. Description of the Related Art

FIG. 1 is a diagram illustrating a configuration of a virtualization system according to related art.

Referring to FIG. 1, the virtualization system supporting at least two operating systems is capable of utilizing resources efficiently on multiple cores. An operating system running on the virtualization layer acts as if it occupies the corresponding hardware resource wholly on its own.

The virtualization software operates in a similar way as a scheduler of the operating system. Accordingly, the virtualization software schedules the individual operating systems running on the virtualization layer as tasks. The operating systems are assigned time resources in a predetermined ratio. In order for the at least two operating systems to share a hardware resource, each operating system use the time resources in up to a predetermined number of time slots (t). How to allocate time resources for each operating system is described below with reference to FIG. 2.

FIG. 2 is a diagram illustrating a method for a plurality of operating systems to share a resource according to related art.

Referring to FIG. 2, the first operating system (OS1) 210 consumes the time resource allocated for tOS1 and then hands over control to the Virtual Machine Monitor (VMM) as a hypervisor so as to execute tasks necessary for driving hardware. After completing the operations necessary for driving hardware, the VMM hands over the control to the second operating system (OS2) 220. The second operating system 220 consumes the time resource allocated for tOS2. The second operating system 220 then hands over the control to the VMM. A method for each operating system to operate with the allocated time resource is described below with reference to FIG. 3.

FIG. 3 is a flowchart illustrating a method for an operating system to operate with an allocated time resource according to related art.

Referring to FIG. 3, the VMM for driving at least two operating systems starts operating in step 310. Here, the VMM may also be referred to as a hypervisor and control multiple operating systems running in a single host terminal.

The VMM creates a guest OS1 as the first operating system and fixes the weight of the resource allocated to the OS1 in step 320. The VMM creates a guest OS2 as the second operating system and fixes the weight of the resource allocated to the OS2 in step 330.

The VMM adjusts the time quantum per operating system in step 340. The VMM determines whether the scheduler has scheduled the OS1 or OS2 in step 350. If the OS1 has been scheduled, the OS1 runs in step 360. If the OS2 is scheduled, the OS2 runs in step 370.

In such a virtualization system, the time resource allocated according to the workload of the tasks executed in the individual operating systems may not be consumed completely. While one operating system is idle, the other operating system may be slacking due to the lack of resource. Such a situation is described with reference to FIG. 4.

FIG. 4 is a diagram illustrating behaviors of operating systems in a method according to related art.

Referring to FIG. 4, the time resource consumptions of the first operating system (General Purpose Operating System; GPOS) and the second operating system (Real Time Operating System; RTOS) vary according to the executed tasks. However, the time resources allocated to the respective operating systems are fixed to a predetermined amount. Accordingly, although the first operating system consumes a large amount of time while the second operating system consumes a small amount of time, there is no way to reallocate the remaining time resource allocated to the second operating system without consumption to the first operating system. Also, when the first operating system consumes a small amount of time while the second operating system uses a large amount of time, it is impossible for the second operating system to use the time resource allocated to the first operating system but not consumed.

SUMMARY OF THE INVENTION

Aspects of the present invention are to address at least the above-mentioned problems and/or disadvantages and to provide at least the advantages described below. Accordingly, an aspect of the present invention is to provide a method and system for allocating time resource to the respective operating systems dynamically.

In accordance with an aspect of the present invention, a method for allocating resources for a virtualization system supporting at least two operating systems is provided. The method includes allocating resources to the operating systems, calculating, when one of the operating systems is running, workloads for each operating system, and adjusting resources allocated to the operating systems according to the calculated workloads.

In accordance with another aspect of the present invention, a system for allocating resources is provided. The system includes a scheduler for allocating resources to at least two operating systems, and a weight controller for calculating, when the operating systems are running, workloads for each operating system and for adjusting resources allocated to the operating systems according to the calculated workloads.

In accordance with another aspect of the present invention, a computer is provided. The computer includes a multi core processor including a plurality of cores, at least two operating systems, and virtualization software for controlling the simultaneous operation of the at least two operating systems on the multi core processor. The virtualization software includes a scheduler for allocating resources to the at least two operating systems, and a weight controller for calculating workloads for each operating system when the operating systems are running, and for adjusting the resources allocated to the operating systems according to the calculated workloads.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
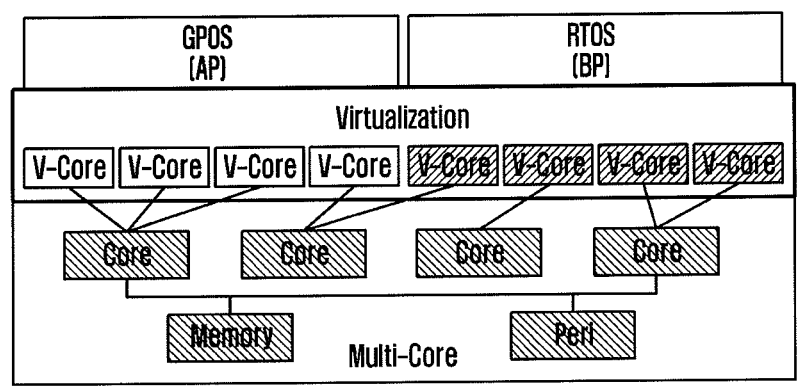
FIG. 1 is a diagram illustrating a configuration of a virtualization system according to related art.
Figure 2:
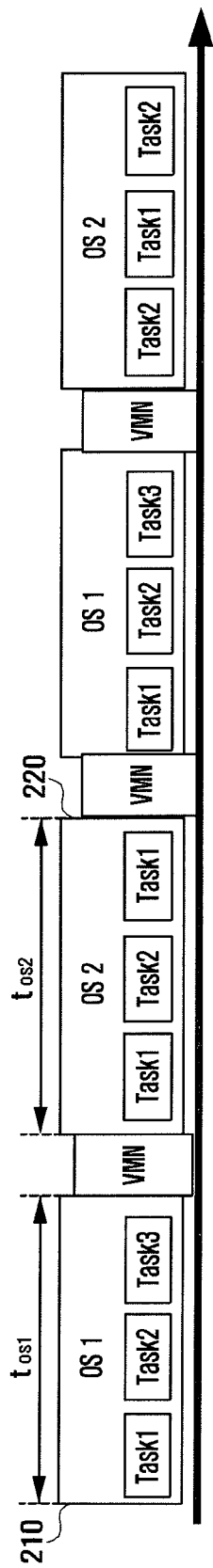
FIG. 2 is a diagram illustrating the principle of a method for a plurality of operating systems to share a resource according to related art.
Figure 3:
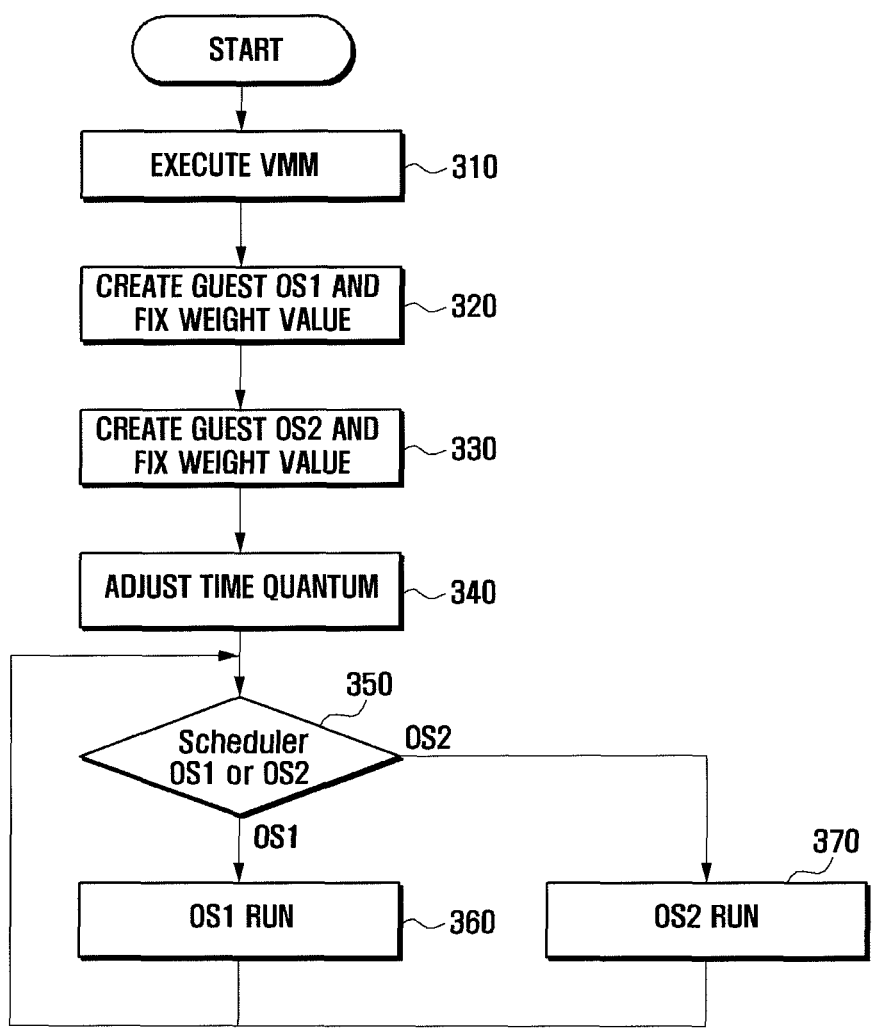
FIG. 3 is a flowchart illustrating a method for an operating system to operate with allocated time resources according to related art.
Figure 4:
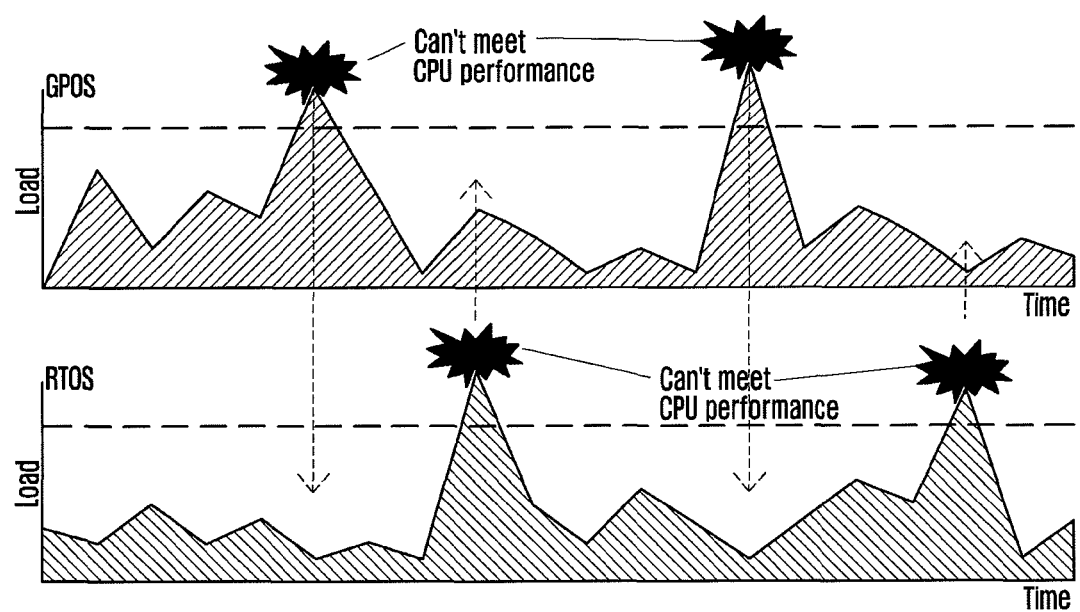
FIG. 4 is a diagram illustrating behaviors of operating systems in a method according to related art.
Figure 5:
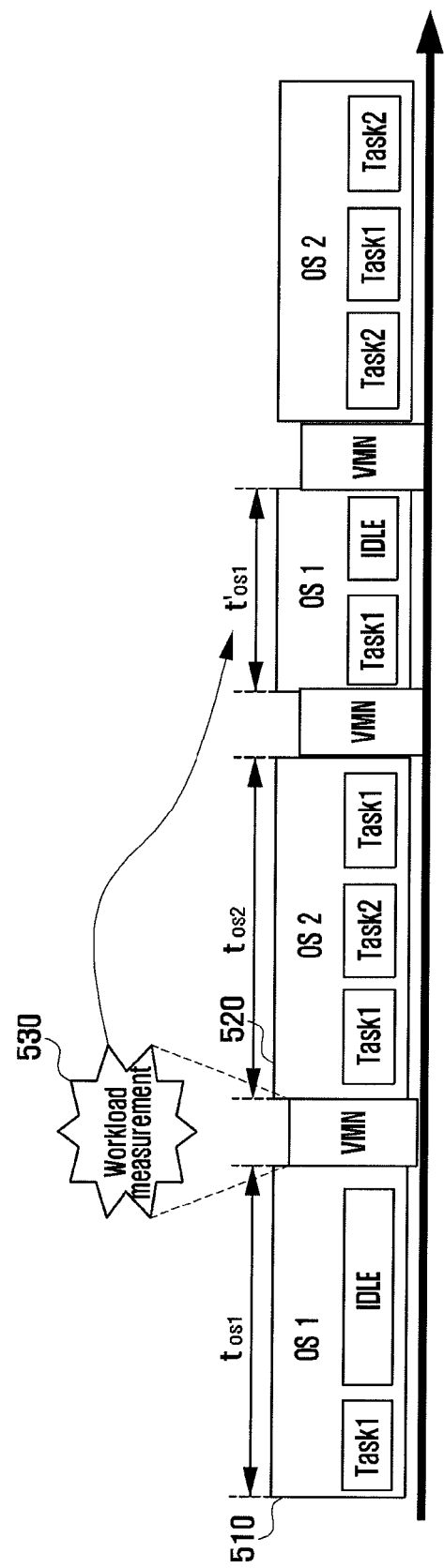
FIG. 5 is a diagram illustrating a principle of a resource allocation method according to an exemplary embodiment of the present invention.

FIG. 5 is a diagram illustrating a principle of a resource allocation method according to an exemplary embodiment of the present invention.

Referring to FIG. 5, the first operating system (OS1) 510 is allocated the time resource tOS1, and the second operating system (OS2) 520 is allocated the time resource tOS2. The workload 530 per operating system is measured, and the time resources are allocated dynamically according to the measurement result. FIG. 5 is depicted under the assumption that the workload of OS1 is small such that the time resource t'OS1 determined according to the measured workload is smaller than the initially allocated time resource tOS1. Although not illustrated, if OS1 operates under high workload, the time resource t'OS1 determined according to the measured workload may be larger than the initially allocated time resource tOS1.

A virtualization system for allocating resources for each operating system depending on the measured workload is described below with reference to FIG. 6.

Figure 6:
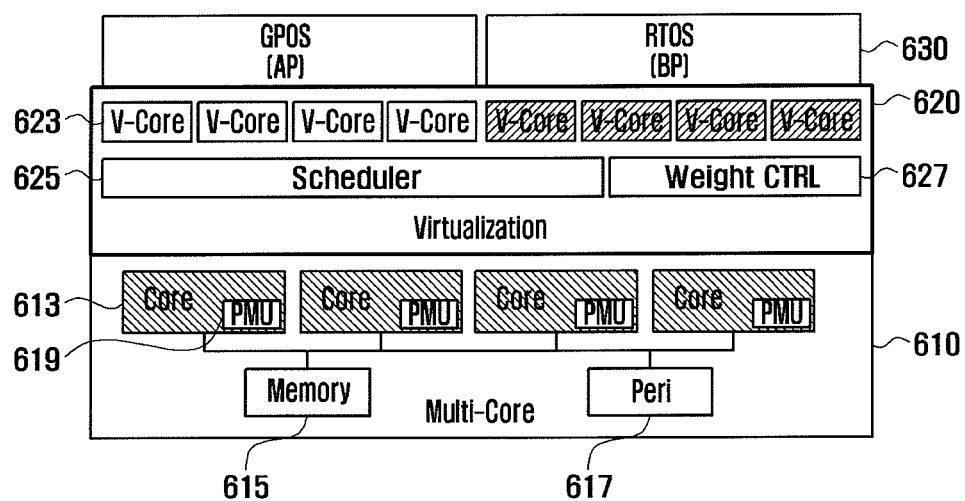
FIG. 6 is a block diagram illustrating a configuration of a virtualization system according to an exemplary embodiment of the present invention.

FIG. 6 is a block diagram illustrating a configuration of a virtualization system according to an exemplary embodiment of the present invention.

Referring to FIG. 6, the virtualization system supporting at least two operating systems includes hardware 610, virtualization software 620, and operating systems 630.

The hardware 610 includes a plurality of cores 613, a memory 615, and peripheral devices 617. The cores 613 are the main processing circuits responsible for processing functions of the virtualization system. The cores 613 include a Performance Monitoring Unit (PMU) 619 for measuring the workload of the operating systems 630. The PMU 619 calculates the power consumed by the system. The PMU 619 may count the number signal transmissions from the cores 613 to the components of the hardware 610 and calculate the power consumption in accordance with the memory usage.

The memory 615 stores the data generated as a result of function execution in the virtualization system and the programs for executing functions. The peripheral devices 617 are devices connected to the virtualization system.

The virtualization software 620 is configured such that at least two operating systems 630 are running on the hardware 610 simultaneously. The virtualization software 620 includes a plurality of virtual cores 623, a scheduler 625, and a weight controller 627.

A virtual core 623 denotes a core running on the virtualization layer. The operating systems 630 identify the virtual cores 623 as the cores of the hardware 610 in the virtualization system. The scheduler 625 allocates resources for each operating system and schedules the virtual cores 623 for the operation of the operating systems 630. The scheduler 625 may allocate the time resources to the virtual cores 623 differently according to the workload of the operating system 630 running on the virtual core 623.

The workload of the operating system 630 is calculated by the weight controller 627. The weight controller 627 may measure the workload by monitoring the running state of the operating system 630. The weight controller 627 may measure the workload based on whether the operating system 630 is executing a task. A method for the weight controller 627 to measure the workload is described below with reference to FIGS. 7 to 9.

The operating system 630 manages the system hardware 610 and provides the hardware virtualization platform and common system services for executing application software. The operating systems 630 run on the virtual core 623 included in the virtualization software 620.

In the above structured virtualization system in which at least two operating systems are running, the workload is measured for each operating system, and the weight for the time resources to be allocated to each operating system is determined according to the measured workload. The description is made under the assumption that the first and second operating systems are running on the virtualization system. If the workload of the first operating system is greater than that of the second operating system, the virtualization system adjusts the weight of the time resources to be allocated to the second operating system so as to increase the weight of the time resources allocated to the first operating system. If the workload of the first operating system is less than that of the second operating system, the virtualization system adjusts the weight of the time resources allocated to the first operating system so as to increase the weight of the time resources allocated to the second operating system. A method for measuring the workload of each operating system is described below with reference to FIGS. 7 to 9.

The workload may be calculated in two ways according to the running states of the operating systems. The first method is to notify the weight controller of the idle state periods of the operating systems. The second method is to use the PMU of each core. The method for measuring the workload based on the idle state period of the operating system is described below with reference to FIGS. 7 and 8.

Figure 7:
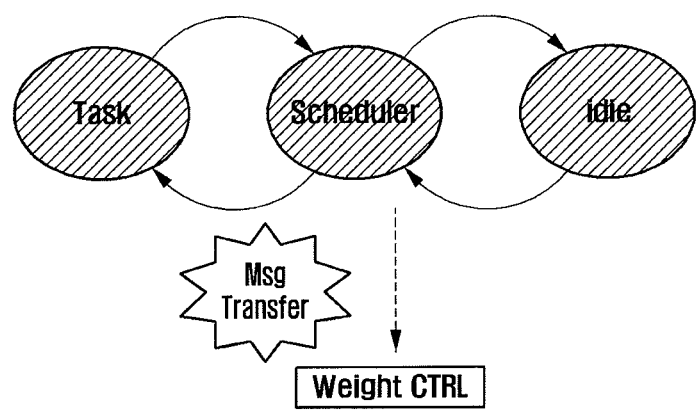
FIG. 7 is diagram illustrating a method for measuring a workload of operating systems according to a first exemplary embodiment of the present invention.

FIG. 7 is diagram illustrating a method for measuring a workload of operating systems according to a first exemplary embodiment of the present invention.

Referring to FIG. 7, each operating system notifies the weight controller 627 of the time of the start or end of the idle state. While the operating systems are executing tasks according to the scheduling of the scheduler 625, the scheduler sends the weight controller 627 a message indicating the end of an idle state and the starting of a task in the corresponding operating system according to the scheduling order. If the operating system enters the idle state according to the scheduling of the scheduler 615, the scheduler sends the weight controller 627 a message indicating that the operating system has entered the idle state. The weight controller 627 determines the workload of the operating system as depicted in FIG. 8.

Figure 8:
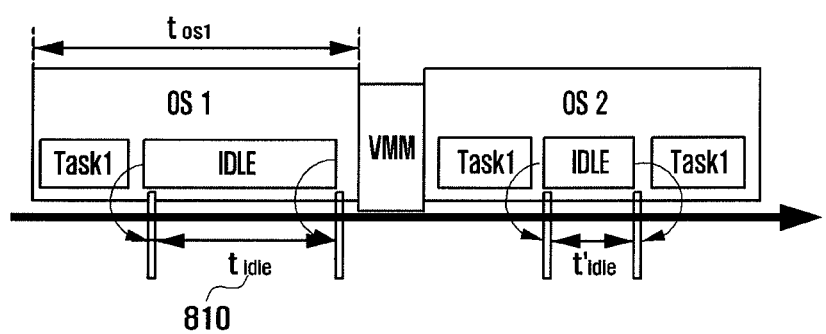
FIG. 8 is a diagram illustrating a principle of determining a workload of an operating system according to the first exemplary embodiment of the present invention.

FIG. 8 is a diagram illustrating a principle of determining a workload of an operating system according to the first exemplary embodiment of the present invention.

Referring to FIG. 8, the weight controller 627 determines the start and end times of the idle state of each operating system according to the message from the scheduler. The weight controller 627 determines the idle state period of the operating system (tidle) 810 based on the start and end time points of the idle state.

The weight controller 627 calculates the workload of the operating system using the idle state period (tidle) 810 and the time resource (tos) allocated to the operating system. The weight controller 627 calculates the workload of the operating system using Equation (1):

$$\text{workload} = (tos - tidle)/tos \qquad \text{Equation (1)}$$

Using the workload calculated by Equation (1), the weight controller 627 can adjust the time resources to be allocated to each operating system by controlling the scheduler 625.

A method for measuring a workload using the PMU of each core is described below with reference to FIG. 9.

Figure 9:
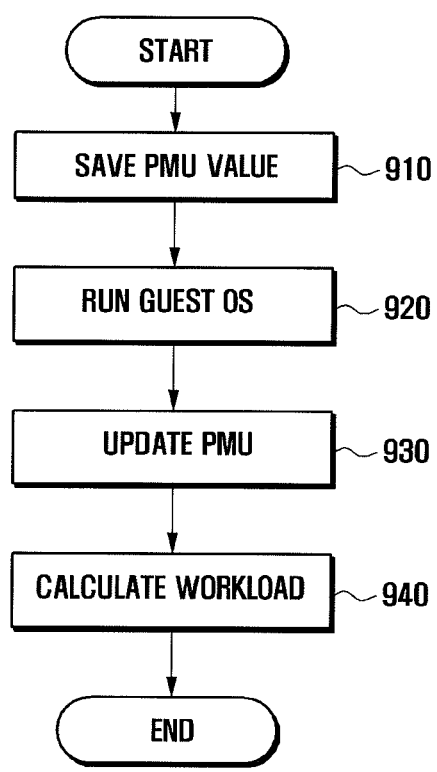
FIG. 9 is a flowchart illustrating a method for measuring a workload of the operating system according to a second exemplary embodiment of the present invention.

FIG. 9 is a flowchart illustrating a method for measuring a workload of an operating system according to a second exemplary embodiment of the present invention.

Referring to FIG. 9, the weight controller 627 saves the PMU values estimated when the operating system starts running according to the scheduling of the scheduler 625 in step 910. The PMU value includes the number of times of signal transmissions from the core 613 to the memory 615 and the memory usage amount.

The weight controller determines the running state of the operating systems according to the scheduling of the scheduler 625 in step 920. The weight controller determines whether the corresponding operating system is executing a task according to the scheduling. If the operating system has completed the execution of the task, the weight controller 627 updates the PMU values by reflecting the completion of the task execution in the operating system in step 930. The weight controller calculates the workload of the operating system using the initially stored PMU values and the updated PMU values in step 940. The workload calculation may be performed using a combination of some values of the PMU values, and the PMU values can be changed according to the operating status of each system. The description is made under the assumption that the workload is calculated with the number of memory transactions and the memory usage as PMU values.

Once the number of signal transmissions to the memory and the memory usage are estimated as PMU values, the weight controller 627 calculates the workload of the operating system using Equation (2):

$$\omega \times (t) = \alpha \cdot C(t) + \beta \cdot M(t) + \gamma N(t) \qquad \text{Equation (2)}$$

where $\omega \times (t)$ denotes workload, $C(t)$ denotes a system clock cycle, $M(t)$ denotes a number of memory transactions, and $N(t)$ denotes memory usage. The parameters $\alpha$, $\beta$, and $\gamma$ are threshold values that are selectively used for the system.

After calculating the workloads of the respective operating systems as described above, the weight controller 627 adjusts the weights of the time resources allocated to the operating systems by controlling the scheduler 625. A method for adjusting the weight of the time resources is described below with reference to FIG. 10.

Figure 10:
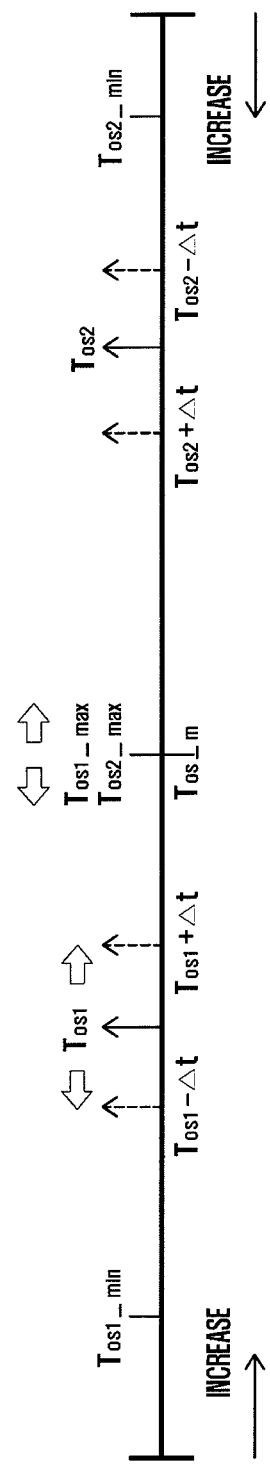
FIG. 10 is a diagram illustrating a method for adjusting weights of time resources of operating systems according to an exemplary embodiment of the present invention.

FIG. 10 is a diagram illustrating a method for adjusting the weights of the time resources of the operating systems according to an exemplary embodiment of the present invention.

Referring to FIG. 10, Tos1_min denotes a minimum time resource available to be allocated to the first operating system, and Tos2_min denotes a minimum time resource available to be allocated to the second operating system. Tos1_max denotes a maximum time resource available to be allocated to the first operating system, and Tos2_max denotes a maximum time resource available to be allocated to the second operating system. Tos_m denotes the middle value of the weight of the total time resource available for the first and second operating systems.

Tos1 denotes the time resources used by the first operating system executing a task, and Tos2 denotes the time resources used by the second operating system executing a task. The time resources to be used by the operating systems may be adjusted according to the workloads of the operating systems. Tos1 may be adjusted by Tos1−Δt or Tos1+Δt according to the workload of the first operating system. Tos2 can be adjusted by Tos2−Δt or Tos2+Δt according to the workloads of the operating systems. Δt is the adjustment threshold value for minimally adjusting the time resources according to the workload of each operating system. The adjustment threshold value may be set at the virtualization system manufacturing stage and according to the operating environment of the virtualization system. −Δt denotes a decrease of time resources by Δt as compared to the initially allocated time resources of the corresponding operating system, and +Δt denotes an increase of time resources by Δt as compared to the initially allocated time resources of the corresponding operating system.

A method for adjusting the weight of time resources based on the workload of the operating system is described below with reference to FIG. 11.

Figure 11:
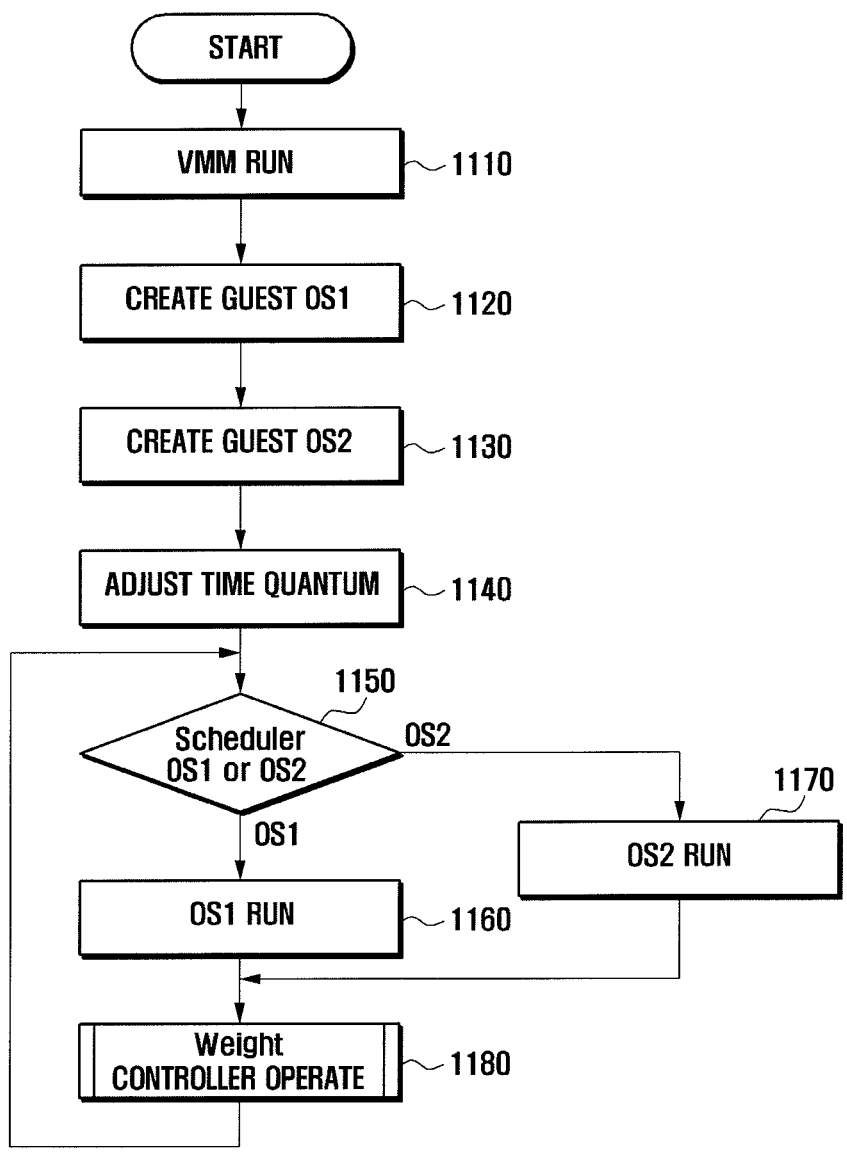
FIG. 11 is a flowchart illustrating a method for allocating time resources to operating systems according to an exemplary embodiment of the present invention.

FIG. 11 is a flowchart illustrating a method for allocating time resources to operating systems according to an exemplary embodiment of the present invention.

Referring to FIG. 11, the virtualization system executes the VMM for running at least two operating systems in step 1110. The virtualization system creates the first operating system OS1 in step 1120 and the second operating system OS2 in step 1130. The virtualization system adjusts the amount of the time resources allocated to the respective OS1 and OS2 in step 1140.

After the time resource allocation, the virtualization system determines whether the scheduler is scheduling OS1 operation or OS2 operation in step 1150. If the OS1 operation is scheduled, the virtualization system executes the operation of OS1 in step 1160. If the OS2 operation is scheduled, the virtualization system executes the operation of OS2 in step 1170. After completing the OS operation, the virtualization system controls the weight controller to adjust the time resources allocated to the respective OSs in step 1180. Step 1180 of FIG. 11 is described below with reference to FIG. 12. After adjusting the time resources allocated to the respective OSs, the virtualization system repeats the procedure from step 1150.

Figure 12:
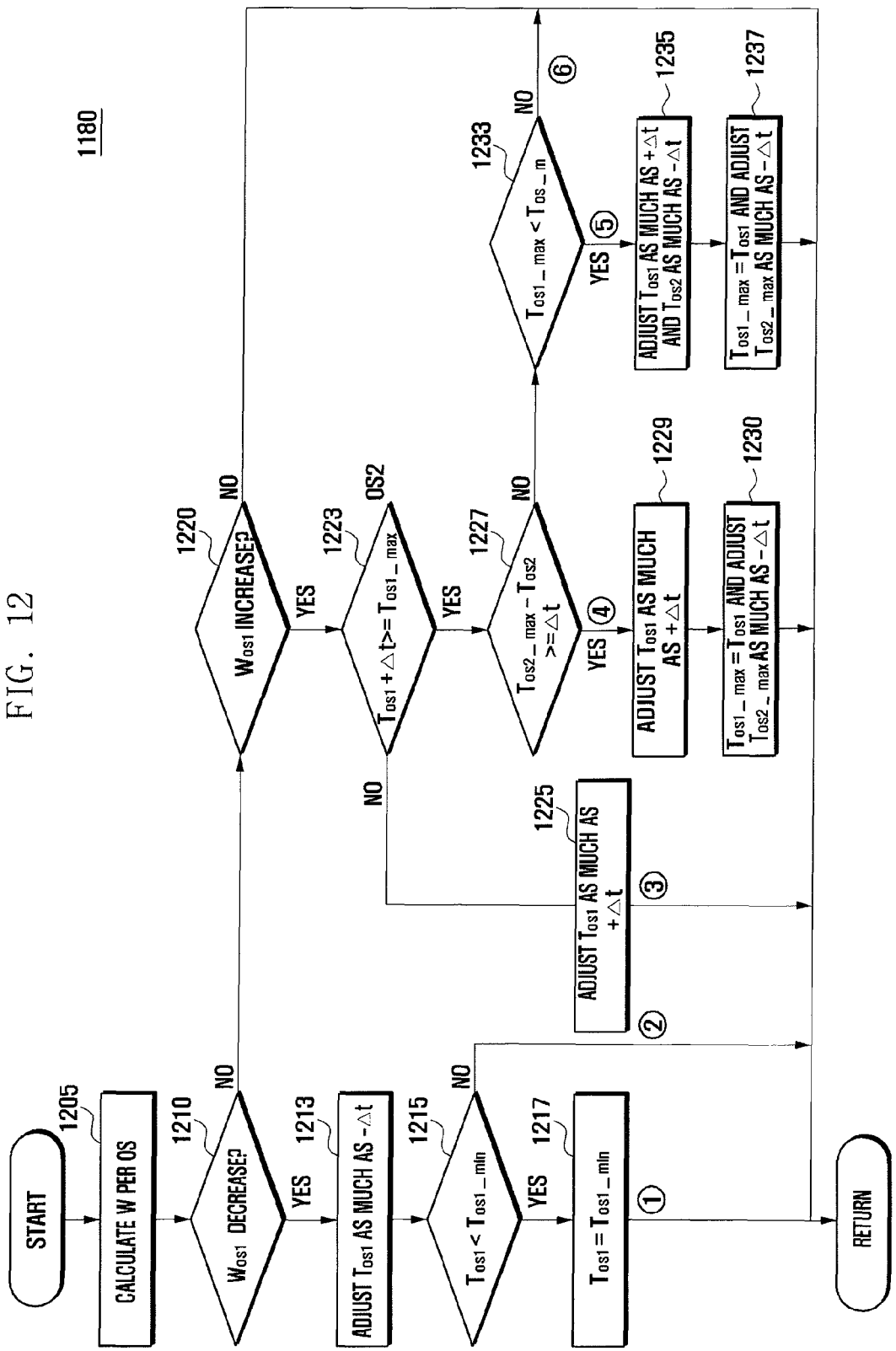
FIG. 12 is a flowchart illustrating a method for adjusting the amounts of time resources allocated to the operating systems depending on workloads according to an exemplary embodiment of the present invention.

FIG. 12 is a flowchart illustrating a method for adjusting amounts of time resources allocated to operating systems depending on workloads according to an exemplary embodiment of the present invention.

Referring to FIG. 12, the virtualization system calculates the workload (W) of each operating system in step 1205. It is assumed that the minimum allocation time resources, Tos1_min and Tos2_min, are allocated as the initial time resources of the respective operating systems. The virtualization system determines whether the workload of OS1 (Wos1) has decreased as compared to the previous workload in step 1210. If Wos1 has decreased, the virtualization system adjusts the weight of the time resources allocated to OS1 (Tos1) by −Δt in step 1213. The virtualization system determines whether the adjusted Tos1 is less than Tos1_min in step 1215. If the adjusted Tos1 is less than Tos1_min, the virtualization system sets Tos1 equal to Tos1_min in step 1217. The reason for setting Tos1 equal to Tos1_min is to guarantee the interactivity of OS1 by guaranteeing a minimum operation of OS1.

If Wos1 has not decreased in step 1210, the virtualization system determines whether Wos1 has increased as compared to the previous workload in step 1220. If Wos1 has increased, the virtualization system determines whether Tos1+Δt is equal to or greater than Tos1_max in step 1223.

If Tos1+Δt is less than Tos1_max, the virtualization system increases Tos1 by +Δt. If Tos1+Δt is equal to or greater than Tos1_max, the virtualization system determines whether the valued obtained by subtracting the current consumption of Tos2 from the maximum time resources allocated to OS2 (Tos2_max) is equal to or greater than Δt in step 1227. If Tos2_max−Tos2 is equal to or greater than Δt, the virtualization system increases the Tos1_max by Δt in step 1229. The virtualization system sets Tos1_max equal to Tos1 which has increased by +Δt and decreases Tos2_max by −Δt in step 1230.

If Tos2_max−Tos2 is less than Δt in step 1227, the virtualization system determines whether Tos1_max is less than Tos_m in step 1233. If Tos1_max is less than Tos_m, the virtualization increases Tos1 by +Δt and decreases Tos2 by −Δt in step 1235. The virtualization system sets Tos1_max equal to Tos1+Δt and decreases Tos2 by −Δt in step 1237. Reference numbers ①, ②, ③, ④, ⑤, and ⑥ of FIG. 12 are provided for cross reference with FIG. 13.

The weight of the time resources adjusted according to the time resource allocation method of FIG. 12 is described below with reference to FIG. 13.

Figure 13:
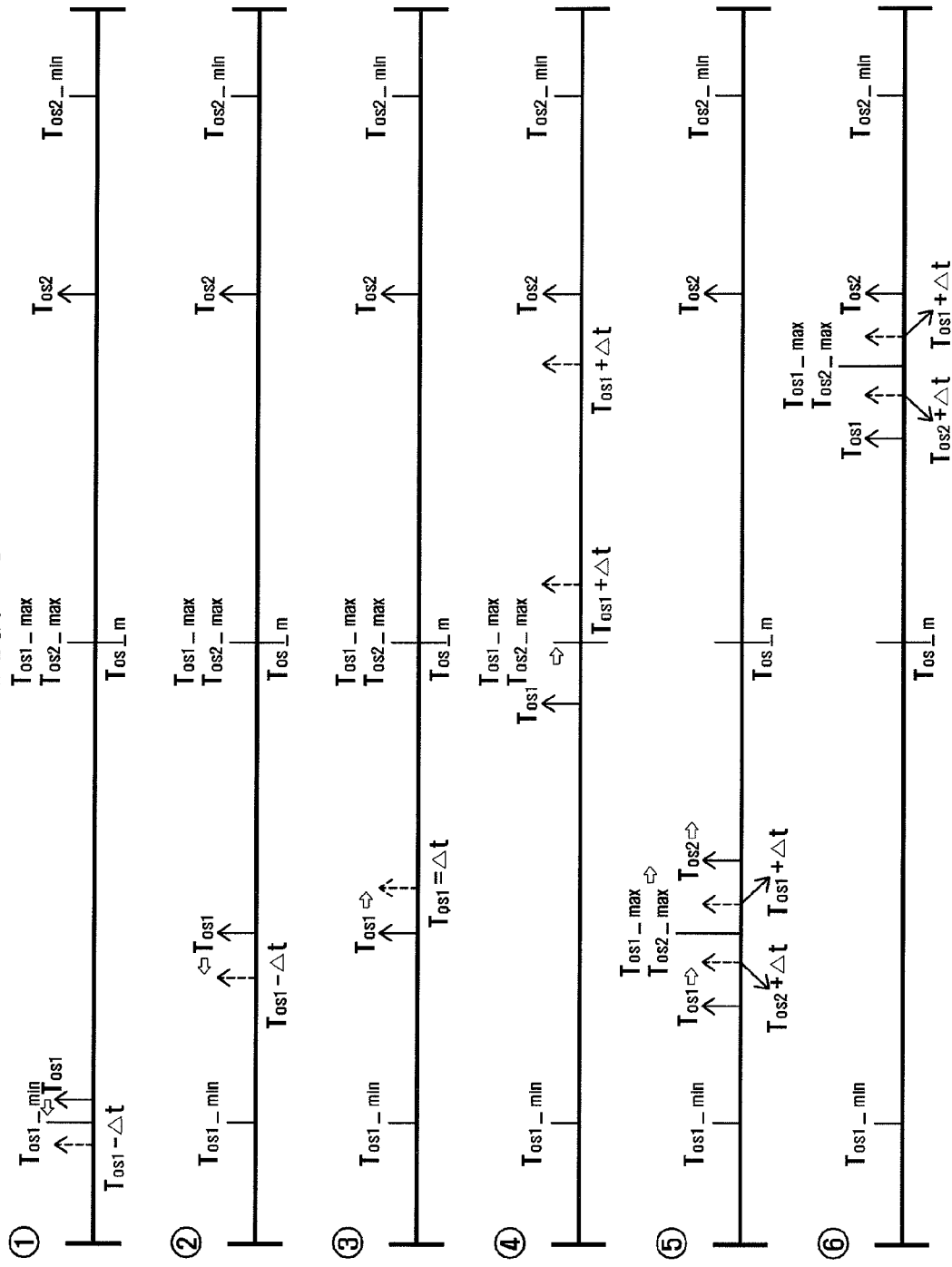
FIG. 13 is a diagram illustrating a principle of adjusting a time resource amount according to an exemplary embodiment of the present invention.

FIG. 13 is a diagram illustrating a principle of adjusting a time resource amount according to an exemplary embodiment of the present invention. In FIGS. 12 and 13, OS1 and OS2 are allocated the time resources of Tos1_min and Tos2_min respectively. The workload of OS1 changes while OS1 is running such that Tos1 is adjusted by Δt.

Referring to FIG. 13, part ① of FIG. 13 shows an exemplary case where, if Tos1 is decreased by −Δt due to the reduced workload of OS1 and if the decreased Tos1 is less than Tos1_min, Tos1 is set equal to Tos1_min. Part ② of FIG. 13 shows an exemplary case where Tos1 is decreased by −Δt due to the reduced workload of OS1. Part ③ of FIG. 13 shows an exemplary case where Tos1 increases by +Δt due to the increased workload of OS1. Part ④ of FIG. 13 shows an exemplary case where Tos1 increased by +Δt is greater than Tos1_max due to the increased workload of OS1. Tos1 may be increased or maintained according to the variation of workload of OS2. If the difference between Tos2 and Tos2_max is greater than Δt when Tos1 has reached Tos1_max, it is possible to decrease Tos1_max by −Δt and increase Tos2 and Tos2_max by Δt.

Part ⑤ of FIG. 13 shows an exemplary case where Tos2_max is decreased and Tos1_max is increased due to the increased workload for Tos1 in a state that Tos1_max has moved to Tos1. Part ⑥ of FIG. 13 shows an exemplary case where Tos1_max and Tos1 are maintained in a state where it is impossible to decrease Tos2_max.

Although the description has been directed to a method for adjusting the time resources allocated to OS1 in adaptation to the workload of OS1, the method may be applied for the other OS. The time resources allocated to OS2 may be adjusted according to the workload of OS2.

As described above, the resource allocation method according to exemplary embodiments of the present invention is capable of allocating time resources dynamically to multiple operating systems running in the virtualization system. The resource allocation method of the present invention allocates the time resources to the multiple operating systems dynamically so as to minimize resource waste and inefficiency. As a consequence, the resource allocation method according to exemplary embodiments of the present invention is capable of facilitating operations of multiple operating systems running in the virtualization system and reducing power consumption of the virtualization system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating time resources for a virtualization system supporting at least two operating systems (OSs), the method comprising:
    configuring an adjustment value for a first OS and a second OS, and configuring a threshold value for time resource adjustment for each of the first OS and the second OS, the threshold value including an upper limit and a lower limit of the time resources;
    allocating time resources to the operating systems;
    calculating, when at least one of the operating systems is running, workloads for each operating system;
    adjusting time resources allocated to the first OS based on the calculated workloads and the adjustment value;
    determining, if the time resources of the first OS are decreased by the adjustment value, whether the adjusted time resources are less than the lower limit of the time resources of the first OS;
    allocating, if the adjusted time resources of the first OS are less than the lower limit of the time resources of the first OS, the lower limit of time resources of the first OS as a new time resources of the first OS;
    determining, if the time resources of the first OS are increased by the adjustment value, whether the adjusted time resources of the first OS are greater than the upper limit of the time resources of the first OS;
    determining, if the adjusted time resources of the first OS are greater than the upper limit of the time resources of the first OS, whether a value of the upper limit of the time resources of the second OS minus current time resources of the second OS is greater than the adjustment value; and
    allocating, if the value is greater than the adjustment value, the adjusted time resources of the first OS which is greater than the upper limit of time resources of the first OS as a new time resources of the first OS and decreasing the upper limit of time resources of the second OS by the adjustment value.

2. The method of claim 1, wherein the calculating of the workloads comprises determining operation states of respective operating systems for calculating the workloads.

3. The method of claim 2, wherein the calculating of the workloads further comprises:
    determining idle state periods of the respective operating systems; and
    measuring the workloads of the operating systems according to the idle state periods.

4. The method of claim 1,
    wherein the workload for each operating system is estimated based on performance monitoring unit (PMU) values of each operating system, and
    wherein initially stored PMU values are saved when an operating system of the at least two operating systems starts running, and updated PMU values are saved when the operating system completes a task execution.

5. The method of claim 1, wherein the adjusting of the time resources comprises:
    increasing, when the workload increases, the allocated time resources based on the threshold value; and
    decreasing, when the workload decreases, the allocated time resources based on the threshold value.

6. The method of claim 1, further comprising:
    adjusting the upper limit of the time resources of the first OS to a value of the adjusted time resources of the first OS, and the upper limit of the time resources of the second OS to a value of the configured upper limit of the time resources of the second OS minus the adjustment value.

7. A system for allocating time resources, the system comprising:
    a hardware processor;
    at least two Operating Systems (OSs); and
    virtualization software for controlling the at least two operating systems on the hardware processor,
    wherein the virtualization software includes:
    a scheduler for allocating time resources to each of the at least two operating systems (OSs); and
    a weight controller for:
        configuring an adjustment value for a first OS and a second OS, and configuring a threshold value for time resource adjustment for each of the first OS and the second OS, the threshold value including an upper limit and a lower limit of the time resources,
        calculating, when at least one of the operating systems is running, workloads for each operating system,
        adjusting time resources allocated to the first OS based on the calculated workloads and the adjustment value,
        determining, if the time resources of the first OS are decreased by the adjustment value, whether the adjusted time resources are less than the lower limit of the time resources of the first OS,
        allocating, if the adjusted time resources of the first OS are less than the lower limit of the time resources of the first OS, the lower limit of time resources of the first OS as a new time resources of the first OS,
        determining, if the time resources of the first OS are increased by the adjustment value, whether the adjusted time resources of the first OS are greater than the upper limit of the time resources of the first OS,
        determining, if the adjusted time resources of the first OS are greater than the upper limit of the time resources of the first OS, whether a value of upper limit of time resources of the second OS minus current time resources of the second OS is greater than the adjustment value, and
        allocating, if the value is greater than the adjustment value, the adjusted time resources of the first OS which is greater than the upper limit of time resources of the first OS as a new time resource of the first OS and decreasing the upper limit of time resources of the second OS by the adjustment value.

8. The system of claim 7, wherein the weight controller determines operation states of respective operating systems for calculating the workloads.

9. The system of claim 8, wherein the weight controller is further configured to determine idle state periods of the respective operating systems and measure the workloads of the operating systems according to the idle state periods.

10. The system of claim 7,
    wherein the workload for each operating system is estimated based on performance monitoring unit (PMU) values of each operating system, and
    wherein initially stored PMU values are saved when an operating system of the at least two operating systems starts running, and updated PMU values are saved when the operating system completes a task execution.

11. The system of claim 7, wherein the weight controller increases, when the workload increases, the allocated time resources based on the threshold value and decreases, when the workload decreases, the allocated time resources based on the threshold value.

12. The system of claim 8, wherein the weight controller is further configured to adjust the upper limit of the time resources of the first OS to a value of the adjusted time resources of the first OS, and the upper limit of the time resources of the second OS to a value of the configured upper limit of the time resources of the second OS minus the adjustment value.

13. A computer, comprising:
- a multi core processor including a plurality of cores;
    - at least two operating systems (OSs); and
    - virtualization software for controlling the simultaneous operation of the at least two operating systems on the multi core processor,
- wherein the virtualization software including:
    - a scheduler for allocating time resources to each of the at least two operating systems, and
    - a weight controller for:
        - configuring an adjustment value for a first OS and a second OS, and configuring a threshold value for time resource adjustment for each of the first OS and the second OS, the threshold value including an upper limit and a lower limit of the time resources,
        - calculating, when at least one of the operating systems is running, workloads for each operating system,
        - adjusting the time resources allocated to the first OS based on the calculated workloads and the adjustment value,
        - determining, if the time resources of the first OS are decreased by the adjustment value, whether the adjusted time resources of the first OS are less than the lower limit of the time resources of the first OS,
        - allocating, if the adjusted time resources of the first OS are less than the lower limit of the time resources of the first OS, the lower limit of time resources as a new time resource of the first OS,
        - determining, if the time resources of the first OS are increased by the adjustment, whether the adjusted time resources of the first OS are greater than the upper limit of the time resources of the first OS,
        - determining, if the adjusted time resources of the first OS are greater than the upper limit of the time resources of the first OS, whether a value of upper limit of the time resources of the second OS minus current time resources of the second OS is greater than the adjustment value, and
        - allocating, if the value is greater than the adjustment value, the adjusted time resources of the first OS which is greater than the upper limit of time resources of the first OS as a new time resource of the first OS and decreasing the upper limit of time resources of the second OS by the adjustment value.

14. The computer of claim 13, wherein the weight controller is further configured to identify periods when the operating systems are idle while time resources are allocated to the operating system, and measure the workload of the operating system according to the idle periods.

15. The computer of claim 13, wherein:
- each of the plurality of cores includes a performance monitoring unit for calculating the power consumed by the computer, and
- wherein the weight controller calculates the workloads based on initially stored performance monitoring unit (PMU) values and updated PMU values provided by the performance monitoring units.

* * * * *